(12) United States Patent
Jones et al.

(10) Patent No.: US 9,051,720 B1
(45) Date of Patent: Jun. 9, 2015

(54) UNIVERSAL TRIM KIT

(75) Inventors: Chad Jones, Frisco, TX (US); Steve L. Fillipp, Lubbock, TX (US)

(73) Assignee: DANCO, INC., Irving, TX (US)

( * ) Notice: Subject to any disclaimer, the term of this patent is extended or adjusted under 35 U.S.C. 154(b) by 1183 days.

(21) Appl. No.: 12/416,194

(22) Filed: Apr. 1, 2009

(51) Int. Cl.
*F16L 5/00* (2006.01)
*E03C 1/042* (2006.01)

(52) U.S. Cl.
CPC . *E03C 1/042* (2013.01); *F16L 5/00* (2013.01); *E03C 2201/50* (2013.01)

(58) Field of Classification Search
CPC ......... E03C 1/042; E03C 2201/50; F16L 5/00
USPC ............... 137/315.09–315.15, 356, 359, 360, 137/801, 269; 4/675–678, 695; 285/46, 64; 74/543, 548; 16/402
See application file for complete search history.

(56) References Cited

U.S. PATENT DOCUMENTS

| | | | |
|---|---|---|---|
| 2,966,924 A | | 1/1961 | Young |
| 3,167,855 A | * | 2/1965 | Moen ...................... 29/890.141 |
| 3,443,266 A | * | 5/1969 | Ellison et al. ...................... 4/677 |
| 3,960,016 A | * | 6/1976 | Symmons ...................... 374/148 |
| 4,272,022 A | * | 6/1981 | Evans ........................ 239/107 |
| 4,366,866 A | * | 1/1983 | Sweeney ......................... 169/37 |
| 4,407,023 A | * | 10/1983 | Norton ............................. 285/46 |
| 4,739,596 A | * | 4/1988 | Cunningham et al. ........ 52/220.8 |
| 4,794,945 A | * | 1/1989 | Reback ..................... 137/315.12 |
| 4,796,348 A | | 1/1989 | Rosen |
| 4,842,009 A | * | 6/1989 | Reback ..................... 137/315.15 |
| 5,161,567 A | * | 11/1992 | Humpert ....................... 137/359 |
| 5,257,645 A | * | 11/1993 | Scully et al. .................. 137/359 |
| 5,263,510 A | * | 11/1993 | Heimann et al. .............. 137/359 |
| 6,178,981 B1 | | 1/2001 | Wales |
| 6,283,447 B1 | * | 9/2001 | Fleet ............................. 251/288 |
| 6,378,910 B1 | * | 4/2002 | Maiman ......................... 285/46 |
| 6,422,520 B1 | | 7/2002 | Hand |
| 7,077,150 B2 | | 7/2006 | McNerney |
| 7,631,655 B1 | * | 12/2009 | Kopp ......................... 137/15.18 |
| 2002/0105186 A1 | | 8/2002 | Marty et al. |
| 2003/0192116 A1 | | 10/2003 | Burger et al. |
| 2004/0194825 A1 | | 10/2004 | Kempf et al. |

* cited by examiner

*Primary Examiner* — Kevin Murphy
(74) *Attorney, Agent, or Firm* — Ross Barnes LLP; Monty L. Ross; Robin L. Barnes

(57) ABSTRACT

A universal trim kit for tubs or showers and a variety of different OEM valves is disclosed that includes an escutcheon in the form of a decorative outer ring in combination with a plurality of interchangeable inserts and at least two fasteners, typically screws, for releasably attaching the escutcheon and one of the inserts to a valve body. The escutcheon further comprises a generally circular, centrally disposed aperture surrounded by an annular flange that functions as a seating surface for any of a plurality of interchangeable inserts, each insert being attachable to the outer ring and to a valve body disposed behind the ring, each insert also having a differently sized or shaped aperture configured for attachment to the body of a particular OEM valve.

3 Claims, 3 Drawing Sheets

UNIVERSAL TRIM KIT

BACKGROUND OF THE INVENTION

1. Field of the Invention

This invention relates to an escutcheon or trim kit for tub or shower handles and, more particularly, to a trim kit that uses a standard outer ring in combination with interchangeable inserts for use with different OEM valves.

2. Description of Related Art

OEM valves have various configurations that can require the use of escutcheons having a matching configuration for attachment of the escutcheon and handle.

This invention is intended for use by consumers who wish to change out their tub or shower trim but don't know the specific make or model of the associated valve. Prior patents disclosing various valve and escutcheon assemblies include, for example, U.S. Pat. Nos. 2,966,924; 4,796,348; 6,178,981; 6,442,520; 7,077,150 and United States Patent Application Publication Nos. 2002/0105186; 2003/0192116; 2004/0194825; and 2006/0196549.

SUMMARY OF THE INVENTION

A universal trim kit for use with tubs or showers is disclosed that preferably comprises an escutcheon in the form of a decorative outer ring in combination with a plurality of interchangeable inserts and at least two fasteners, typically screws, for releasably attaching the escutcheon and one of the inserts to a valve body. The escutcheon further comprises a generally circular, centrally disposed aperture surrounded by an annular flange that functions as a seating surface for any of a plurality of interchangeable inserts, each insert being attachable to the outer ring and to a valve body disposed behind the ring, each insert also having a differently sized or shaped aperture configured for attachment to a particular OEM valve body.

According to a preferred embodiment of the invention, the inserts have an outwardly facing surface with appearance features that complement the finish of the escutcheon.

BRIEF DESCRIPTION OF THE DRAWINGS

The apparatus of the invention is further described and explained in relation to the following drawings wherein.

DESCRIPTION OF THE PREFERRED EMBODIMENTS

Figure 1:
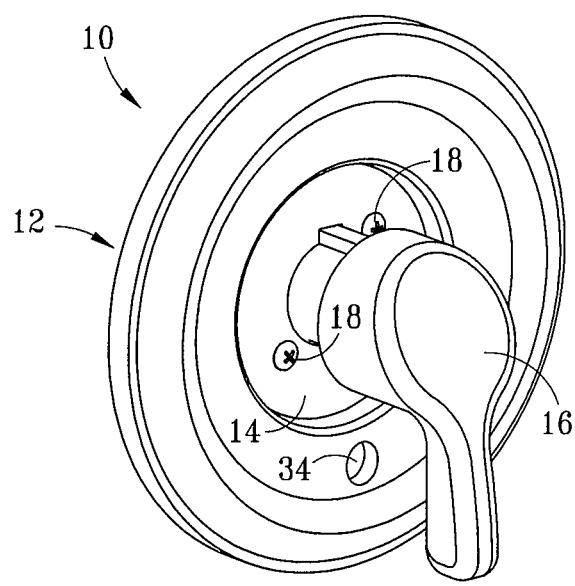
FIG. 1 is a left front perspective view of an escutcheon with one insert of a preferred embodiment of the universal trim kit of the invention attached by screws, with a handle installed on the stem projecting forwardly through an aperture in the insert.
Figure 2:
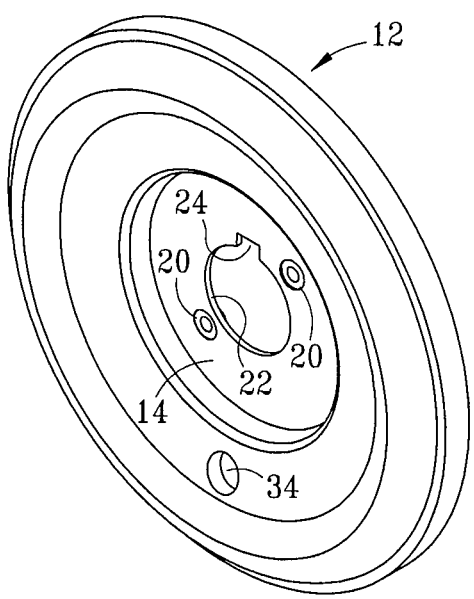
FIG. 2 is a right front perspective view of the escutcheon of FIG. 1 with the handle removed.
Figure 3:
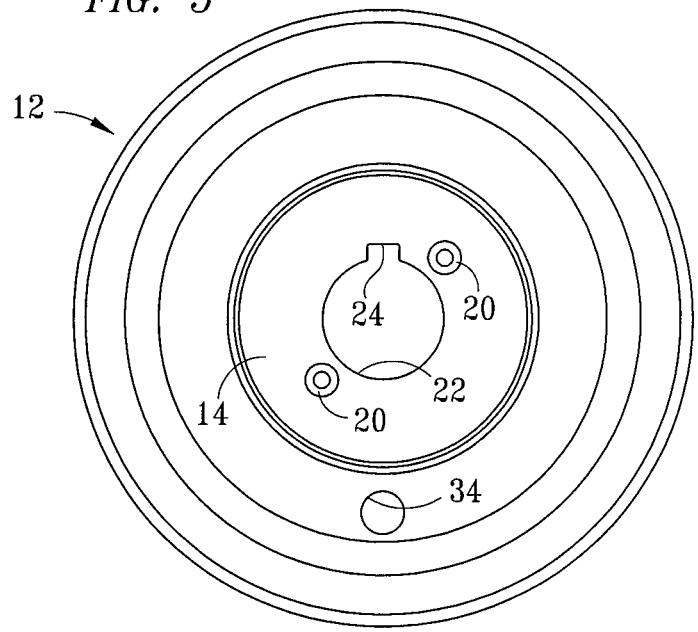
FIG. 3 is a front elevation view of the escutcheon and insert of FIG. 2.
Figure 4:
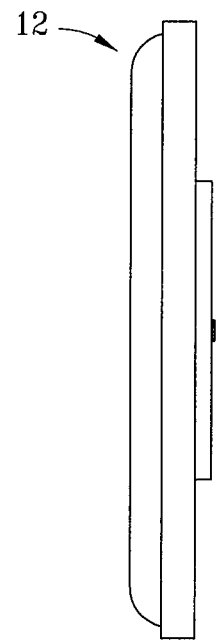
FIG. 4 is a right side elevation view of the escutcheon and insert of FIG. 3.
Figure 5:
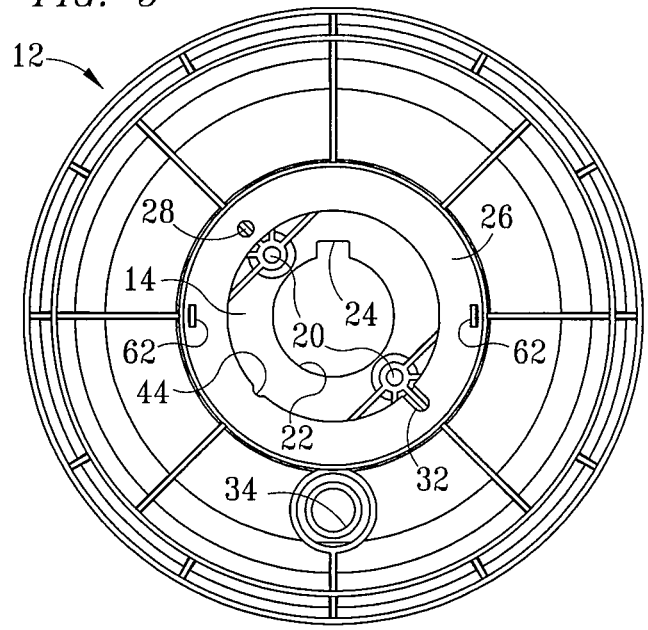
FIG. 5 is a rear elevation view of the escutcheon and insert of FIG. 3.
Figure 6:
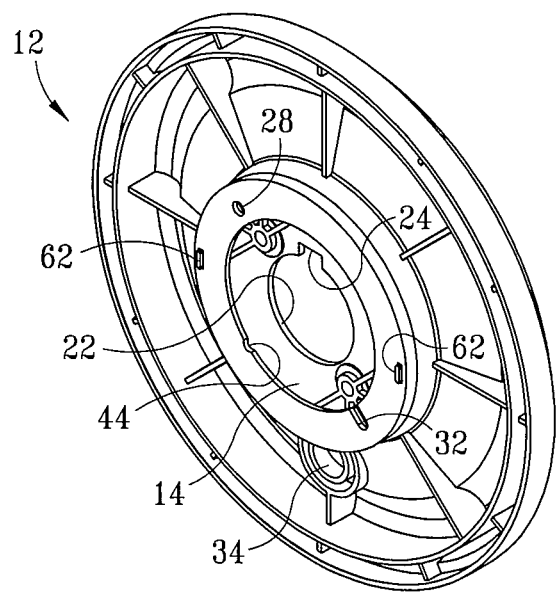
FIG. 6 is a rear perspective view of the escutcheon and insert of FIG. 5.
Figure 7:
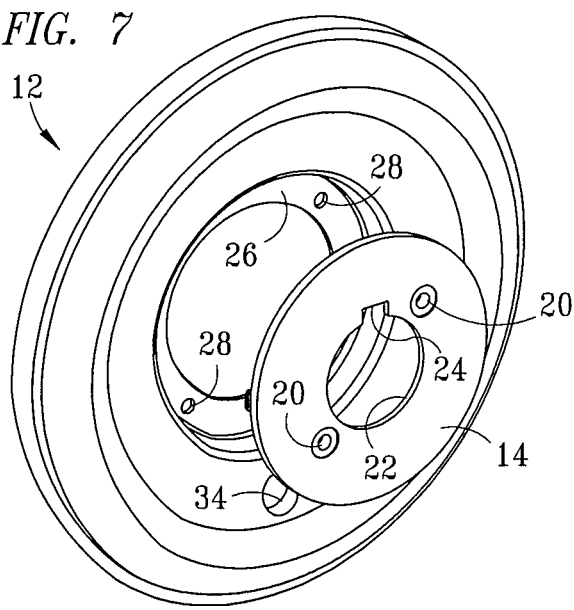
FIG. 7 is a left front perspective view of the escutcheon of FIG. 1, with handle removed and with the insert exploded outwardly from the annular flange.
Figure 9:
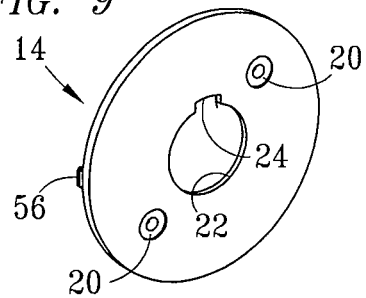
FIG. 9 is a front perspective view of another differently configured insert suitable for use in the universal trim kit of the invention.
Figure 8:
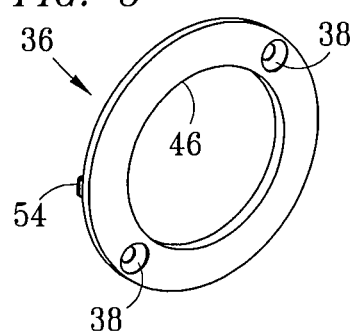
FIG. 8 is a front perspective view of another differently configured insert suitable for use in the universal trim kit of the invention.
Figure 10:
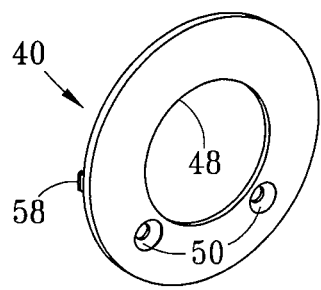
FIG. 10 is a front perspective view of another differently configured insert suitable for use in the universal trim kit of the invention.
Figure 11:
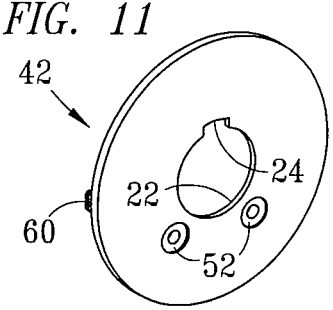
FIG. 11 is a front perspective view of another differently configured insert suitable for use in the universal trim kit of the invention.

Referring to FIGS. 1-7, a universal trim kit 10 is disclosed that preferably comprises an escutcheon 12 suitable for installation in a tub or shower, and an interchangeable insert 14 secured to escutcheon 12 by a pair of screws 18, in combination with a plurality of other interchangeable inserts 36, 40, 42 having different hole sizes and/or configurations (visible in FIGS. 8, 10 and 11, respectively). Referring to FIGS. 1 and 7, interchangeable insert 14 is desirably seated against an annular flange 26 of escutcheon 12 and is secured to flange 26 and to a valve body disposed behind valve stem 15.

Referring to FIG. 7, escutcheon 12 is preferably an aesthetically formed metal, polymeric, or metallized polymeric ring comprising a generally circular, centrally disposed aperture 27 surrounded by an annular flange 26. Annular flange 26 desirably provides a substantially continuous seating surface for any of interchangeable inserts 14, 36, 40, 42 (as seen, for example, in FIGS. 8-11), which can be similarly made. The forwardly facing surface finishes of escutcheon 12 and inserts 14, 36, 40, 42 are desirably similar or complementary to provide an attractive appearance when installed in a tub or shower. Referring to FIGS. 5 and 6, the back side of escutcheon 12 is desirably reinforced with ribs or the like to provide strength and rigidity, and annular flange 26 can be recessed to a position that is substantially coplanar with the rear edge of the peripheral outside wall of escutcheon 12 if desired.

Referring to FIGS. 2-7, annular flange 26 preferably comprises a plurality of smaller fastener holes 28 that are cooperatively alignable with fastener holes in an interchangeable insert to receive fasteners such as screws 18 for attachment of the escutcheon 12 and insert 14 to a valve disposed behind the wall of a tub or shower in which trim kit 10 is installed. Referring to FIG. 8, for example, fastener holes 38 are provided that appear to be directly alignable with holes 28 of annular flange 26 in FIG. 7. Similarly, referring to FIG. 5, fastener holes 20 can be disposed inside bosses if desired, particularly where the fasteners inserted through holes 20 attach directly to a valve body (not visible) and where projecting tabs 54, 56, 58 and 60 on the backs of interchangeable inserts 36, 14, 40 and 42, respectively, are inserted into cooperatively positioned slots 62 (seen in FIGS. 5 and 6).

Referring to FIGS. 8-11, it is seen that each of interchangeable inserts 36, 14, 40 and 42 has a unique combination of aperture shape, aperture size and/or fastener hole position to accommodate the stem or body of a particular OEM valve. Thus, for example, centrally disposed aperture 46 of interchangeable insert 36 has a larger diameter than aperture 48 of insert 40. By comparison, interchangeable inserts 14 and 42 have apertures 22 of the same apparent diameter, but each has a keyway 24 not present in the apertures of inserts 36, 40, and inserts 14 and 42 themselves have different positioning of fastener holes 20, 52. In this way, it is possible to provide in universal trim kit 10 of the invention a single escutcheon together with a plurality of interchangeable inserts having sufficiently varied apertures and fastener hole configurations to accommodate the stems or bodies of any number of popularly used OEM valves.

Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventors are legally entitled.

We claim:

1. A universal trim kit for a bathtub or shower valve, the universal trim kit comprising an escutcheon and a plurality of interchangeable inserts each comprising a valve opening, wherein at least one valve opening is sized or shaped differently from at least one other valve opening, wherein at least two of the plurality of interchangeable inserts each comprises two spaced-apart first fastener holes alignable with holes on the bathtub or shower valve so that the insert may be secured to the valve,
    wherein the escutcheon comprises at least three spaced-apart escutcheon fastener holes, wherein the two spaced-apart fastener holes on a first insert are alignable with the first and second escutcheon fastener holes to form a first aligned pair of fastener holes; and
    wherein the two spaced-apart fastener holes on a second insert are alignable with the second and third escutcheon fastener holes to form a second aligned pair of fastener holes.

2. A universal trim kit for a bathtub or shower valve, the universal trim kit comprising an escutcheon and a plurality of interchangeable inserts each comprising a valve opening, wherein at least one valve opening is sized or shaped differently from at least one other valve opening, wherein at least two of the plurality of interchangeable inserts each comprises two spaced-apart first fastener holes alignable with holes on the bathtub or shower valve so that the insert may be secured to the valve, and
    wherein the two spaced-apart first fastener holes on at least one of the interchangeable inserts are disposed in locations different from the two spaced-apart first fastener holes on at least one other interchangeable insert, so that the first fastener holes on each interchangeable insert are alignable with the holes on the bathtub or shower valve that fits with the size and shape of the valve opening in such interchangeable insert.

3. A universal trim kit for a bathtub or shower valve, the universal trim kit comprising an escutcheon and a plurality of interchangeable inserts each comprising a valve opening, wherein at least one valve opening is sized or shaped differently from at least one other valve opening, wherein at least two of the plurality of interchangeable inserts each comprises two spaced-apart first fastener holes alignable with holes on the bathtub or shower valve so that the insert may be secured to the valve,
    wherein the escutcheon comprises at least three spaced-apart escutcheon fastener holes, wherein the two spaced-apart fastener holes on a first insert are alignable with the first and second escutcheon fastener holes to form a first aligned pair of fastener holes;
    wherein the two spaced-apart fastener holes on a second insert are alignable with the second and third escutcheon fastener holes to form a second aligned pair of fastener holes; and
    wherein the first aligned pair of fastener holes are alignable with holes on one type of bathtub or shower valve that fits with the size and shape of the valve opening on the first insert to secure the escutcheon and the first insert to the valve; and
    wherein the second aligned pair of fastener holes are alignable with holes on another type of bathtub or shower valve that fits the size and shape of the valve opening on the second insert to secure the escutcheon and insert to the valve.

* * * * *